(12) United States Patent
Michaeli

(10) Patent No.: US 8,085,991 B2
(45) Date of Patent: Dec. 27, 2011

(54) FACE NORMALIZATION FOR RECOGNITION AND ENROLLMENT

(75) Inventor: Tomer Michaeli, Karmiel (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 867 days.

(21) Appl. No.: 11/918,291

(22) PCT Filed: Mar. 30, 2006

(86) PCT No.: PCT/IL2006/000397
§ 371 (c)(1),
(2), (4) Date: Jun. 12, 2008

(87) PCT Pub. No.: WO2006/109291
PCT Pub. Date: Oct. 19, 2006

(65) Prior Publication Data
US 2009/0067681 A1    Mar. 12, 2009

(30) Foreign Application Priority Data

Apr. 14, 2005 (IL) .......................................... 168035

(51) Int. Cl.
*G06K 9/00* (2006.01)
(52) U.S. Cl. ...................... 382/115; 382/118
(58) Field of Classification Search .................. 382/115, 382/118, 159, 165, 170, 181
See application file for complete search history.

(56) References Cited

U.S. PATENT DOCUMENTS

| | | | | |
|---|---|---|---|---|
| 7,142,697 | B2 * | 11/2006 | Huang et al. | 382/118 |
| 2004/0258306 | A1 * | 12/2004 | Hashimoto | 382/181 |
| 2005/0058339 | A1 * | 3/2005 | Kato et al. | 382/159 |
| 2005/0147292 | A1 * | 7/2005 | Huang et al. | 382/159 |

FOREIGN PATENT DOCUMENTS

| WO | WO 03/030087 | 4/2003 |
|---|---|---|
| WO | WO03030087 | 4/2003 |

OTHER PUBLICATIONS

Hyung-Soo Lee et al: "Pose invariant face . . . feature space", HCI/ECCV, 2004, pp. 211-220, XP019006103.
Sanderson C et al: "Statistical transformations . . . verification", Image Processing, 2004, Int'l Conf. on Singapore, NJ, USA, IEEE, vol. 1, Oct. 24, 2004, pp. 585-588, XP010784885.
Beymer D et al: Face recognition . . . view, Proceed. of the 5th Inter'l Conf. on Computer Vision, IEEE, US, vol. Conf.5, Jun. 20, 1995, pp. 500-507, XP000557404.
Zhao et al: "SFS based view . . . recognition", 2000 Proceedings, 4th IEEE Int'l Conf. on Grenoble, France, Los Alamitos, USA, IEEE, US, Mar. 28, 2000, pp. 285-292, XP010378273.
Ezzat T et al: "Facial analysis and . . . models", Automatic Face . . . , Proceed. of the 2nd Int'l Conf. on Killington, USA, Oct. 14-16, 1996, IEEE, Oct. 14, 1996, pp. 116-121, XP010200408.

(Continued)

*Primary Examiner* — Brian Le
(74) *Attorney, Agent, or Firm* — Ohlandt, Greeley, Ruggiero & Perle, LLP

(57) ABSTRACT

The present invention is an iterative method for normalization of a probe image against the Eigenspace learned from a database of images. The invention is also an iterative method for normalizing the n images in a database, wherein the normalization is carried out without using a predetermined criterion.

2 Claims, 2 Drawing Sheets

OTHER PUBLICATIONS

International Search Report dated Sep. 5, 2006.

Hung-Soo et al., "Pose Invariant Face Recognition Using Linear Pose Transformation in Feature Space," HCI/ECCV, pp. 211-220, 2004 (abstract only).

Sanderson et al., "Statistical Transformations of Frontal Models for Non-Frontal Face Verification," Image Processing, pp. 585-588, 2004 (abstract only).

Beymer et al., "Face Recognition from One Example View," MIT Artificial Intelligenge Laboratory, pp. 500-507, 1995 (abstract only).

Wen Yi Zhao et al., "SFS based view sysnthesis for robust face recongition," Fourth IEEE International Conference on Grenoble, France, pp. 285-292, Mar. 2000 (abstract only).

Ezzat et al., "Facial Analysis and Synthesis Using Image-Based Models," Proceedings of the Second International Conference on Automatic Face Recognition, pp. 116-121, Oct. 1996.

* cited by examiner

FACE NORMALIZATION FOR RECOGNITION AND ENROLLMENT

FIELD OF THE INVENTION

The invention relates to the field of face recognition systems. Specifically the invention provides a method for face normalization that is applicable to both the enrollment and recognition stages of the process.

BACKGROUND OF THE INVENTION

The purpose of face recognition systems is to identify a person from his picture by comparing an unidentified image, known as a probe image, to known images in a data base that has been prepared earlier.

The basic model of a face recognition system comprises two parts—Enrolment and Recognition (Verification/Identification). First, the initial registration "template", which is a picture or collections of parameters, of the user (person to be identified) has to be constructed. This is done by collecting one or more sample images of his/her face. Salient features (for example, the coefficients of the Eigenfaces) are extracted from the samples, and the results are combined into the template. The construction of this initial template is called Enrollment. This initial template is then stored by the application (computer and software), and essentially takes the place of a password.

Thereafter, whenever the user needs to be authenticated, the user identifies himself, live images are captured from the camera, processed into a usable form, and matched against the template that was enrolled earlier. This form of authentication is called Verification, since it verifies that a user is who he says he is (i.e., verifies a particular asserted identity).

A second form of authentication is called Identification. In this form, a user does not have to assert an identity; the application compares the processed samples of the user against a specified population of templates, and decides which ones match most closely. Depending on the match probabilities, the user's identity could be concluded to be that corresponding to the template with the closest match.

Both in the enrollment and in the recognition stages, two important tasks must be carried out prior to the storage/recognition of the face—face detection and face normalization. The goal of face detection is to determine whether or not there are any faces in the image and, if present, notify the application of the image location and extent of each face. Given an image of a face, the goal of face normalization is to produce a canonical image that complies closely as possible with the given data base of face images.

Since normalization is used both in the enrollment and in the recognition stages, it should compensate for conditions, such as pose variations of the head or facial expressions, which might affect the appearance of a face in an image. A typical case is recognizing a non-frontal view of a face when the reference image in the database contains a frontal view of the same face. In this case the normalization algorithm is expected to produce a frontal view of the face so that it can be compared with the reference image.

The need to transform the probe image into a standard form is therefore obvious. But the most important question is—what is the optimal standard form? Normalization algorithms that have been published in the literature, as well as those used in commercial face recognition products, define the standard canonical form in advance. One example is rotating, scaling and translating the image so that the eyes appear at predefined locations. Another example is producing a frontal view of the face. These existing techniques disregard the original nature of the images to be entered into the database. For example, suppose the database images that were acquired by a camera mounted over the head with a 20 degree tilt angle. Instead of producing canonical frontal view faces prior to enrolling the images, it would be better to transform every new probe image to appear as if taken by a camera with a 20 degree tilt angle. A more complicated example is when all the people in the database appear smiling for some reason. In this case, better results can be expected if an image of a smiling face is produced prior to recognizing a new person.

It is a purpose of the present invention to provide a face normalization method that is best adapted to the original images to be enrolled into the database.

It is another purpose of the present invention to provide a face normalization method that best suites Eigenfaces methodology for recognizing faces.

It is yet another purpose of the present invention to provide a face normalization method that provides the best approximation of a face in the database with a constant template length; thereby providing the best recognition accuracy with the smallest storage capacity possible when using the Eigenfaces method.

Further purposes and advantages of this invention will appear as the description proceeds.

SUMMARY OF THE INVENTION

In a first aspect, the present invention is an iterative method for normalization of a probe image against the Eigenspace learned from a database of images. The method comprises the following steps:
   (a) initialize the transformation parameters according to the probe image gathered in the detection stage;
   (b) construct a deformed grid using the transformation parameters;
   (c) resample the image using the deformed grid to obtain a resampled image;
   (d) form a set of linear equations that describe the set of transformation parameters and Eigenspace coefficients that, if used to resample the image, will allow improved representation of the image in the Eigenspace as compared to the representation obtained in the previous iteration;
   (e) solve the set of linear equations to simultaneously obtain the transformation parameters and the Eigenspace coefficients; and
   (f) repeat steps (b) through (e) until the change in the transformation parameters is less than a predetermined threshold.

In another aspect, the invention is an iterative method for normalizing the n images in a database. The normalization is carried out without using a predetermined criterion. The method comprises the following steps:
   (a) construct an Eigenspace comprising all of the images in the database except one;
   (b) use the method of the invention for normalization of a probe image against the Eigenspace learned from a database of images to normalize the one image with respect to the Eigenspace formed from the remaining n−1 images;
   (c) repeat steps (a) and (b) n times, one each time for a different image; and
   (d) repeat steps (a) to (c) using the normalized images until the changes in the transformation parameters between two consecutive iterations are smaller than a predetermined value.

DETAILED DESCRIPTION OF PREFERRED EMBODIMENTS

1. Mathematical Concept

Figure 1A:
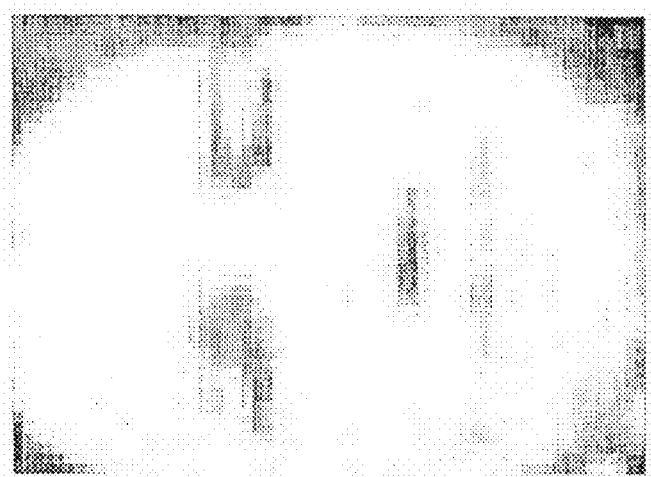
FIGS. 1A to 1C show how the normalization algorithm produces a canonical image of a face by using an Eigenspace of frontal views of faces and a polynomial transformation.

According to the invention, the creation of a canonical image is performed by warping the original image using a predefined parametric transformation. The parameters of the transformation are found by minimizing the mean squared error (MSE) between the warped image and its projection onto an Eigenspace learned from the database. The warping of the image is done by deforming a rectangular grid and resampling the image with the deformed grid.

In the following the notation of slant letters is used for functions of (x,y) and bold letters are used to represent their corresponding column stack rearrangement as vectors. For example $\phi$ is the column stack representation of $\phi(x,y)$.

If $\{\phi_1^x(x,y), \ldots, \phi_K^x(x,y), \phi_1^y(x,y), \ldots, \phi_K^y(x,y)\}$ is a set of 2K functions then the allowed deformations, written as mappings from (x,y) to (x',y'), are:

$$x' = \sum_{i=1}^{K} s_i \phi_i^x(x, y)$$

$$y' = \sum_{i=1}^{K} t_i \phi_i^y(x, y)$$

where, $\{s_i, t_i\}_{i=1}^{K}$ are 2K scalar parameters that define the desired transformation.

The L Eigen vectors of the covariance matrix of the images (in column stack representation) in the database which correspond to the L largest Eigen values are $\{\psi_i\}_{i=1}^{L}$. The mean of the faces in the database is $\mu$. If the images have size M×N pixels, then the vectors $\{\psi_i\}_{i=1}^{L}$, and the vector $\mu$ are of size MN×1. The vectors $\{\psi_i\}_{i=1}^{L}$, are called Eigenfaces and the subspace spanned by them is called the Eigenspace.

Every new probe image of a face can be approximated by $$I \approx \mu + \sum_{i=1}^{L} p_i \psi_i$$

where I is a column-stack representation of the image and $\{p_i\}_{i=1}^{N}$ are L scalar parameters which are referred to as the Eigenspace coefficients. The quality of the reconstruction depends on the resemblance of the image to the database images used to construct the Eigenfaces. The purpose of the normalization algorithm is to warp the image so that it can be best approximated by a combination of the Eigenfaces. The algorithm works iteratively to estimate the transformation parameters for the warping and the Eigenspace coefficients.

2. Face Normalization Algorithm

In the previous section was described the basic mathematical principles on which the invention is based. In this section will be described an algorithm which takes an image of a face as input and produces a canonical image that best complies with a given database of images.

$(x^{(0)}, y^{(0)}) = [1 \ldots N] \times [1 \ldots M]$ represents a rectangular grid and $\{s_i^{(k)}, t_i^{(k)}\}_{i=1}^{K}$, and $\{p_i^{(k)}\}_{i=1}^{L}$ are the estimated parameters at the $k^{th}$ iteration of the algorithm of the invention. The grid points at the $k^{th}$ iteration are denoted $(x^{(k)}, y^{(k)})$ and are given by:

$$x^{(k)} = \sum_{i=1}^{K} s_i^{(k)} \phi_i^x(x^{(0)}, y^{(0)}) \tag{1}$$

$$y^{(k)} = \sum_{i=1}^{K} t_i^{(k)} \phi_i^y(x^{(0)}, y^{(0)})$$

The image, sampled at $(x^{(k+1)}, y^{(k+1)})$, is a function of the parameters $\{s_i^{(k+1)}, t_i^{(k+1)}\}_{i=1}^{K}$. A Taylor series expansion of $I(x^{(k+1)}, y^{(k+1)})$ about the parameters from the $k^{th}$ iteration—$\{s_i^{(k)}, t_i^{(k)}\}_{i=1}^{K}$, is now performed in order to obtain the "resampled image.

$$I(x^{(k+1)}, y^{(k+1)}) \approx I(x^{(k)}, y^{(k)}) + \sum_{i=1}^{K} \frac{\partial I}{\partial x}\bigg|_{(x^{(k)}, y^{(k)})} \tag{2}$$

$$\frac{\partial x^{(k+1)}}{\partial s_i^{(k+1)}}\bigg|_{(x^{(k)}, y^{(k)})} + \sum_{i=1}^{K} \frac{\partial I}{\partial y}\bigg|_{(x^{(k)}, y^{(k)})} \frac{\partial y^{(k+1)}}{\partial t_i^{(k+1)}}\bigg|_{(x^{(k)}, y^{(k)})} =$$

$$I(x^{(k)}, y^{(k)}) + \sum_{i=1}^{K} \frac{\partial I}{\partial x}\bigg|_{(x^{(k)}, y^{(k)})} \phi_i^x(x^{(0)}, y^{(0)})(s_i^{(k+1)} - s_i^{(k)}) +$$

$$\sum_{i=1}^{K} \frac{\partial I}{\partial y}\bigg|_{(x^{(k)}, y^{(k)})} \phi_i^y(x^{(0)}, y^{(0)})(t_i^{(k+1)} - t_i^{(k)})$$

The next step is to obtain a good approximation of the re-sampled image as a linear combination of the Eigenspase basis vectors. This constraint is formulated as follows:

$$I(x^{(k+1)}, y^{(k+1)}) = \mu(x^{(0)}, y^{(0)}) + \sum_{i=1}^{L} p_i \psi_i(x^{(0)}, y^{(0)}) \tag{3}$$

Now (2) and (3) are combined to get:

$$\sum_{i=1}^{L} \psi_i(x^{(0)}, y^{(0)}) p_i - \sum_{i=1}^{K} \frac{\partial I}{\partial x}\bigg|_{(x^{(k)}, y^{(k)})} \tag{4}$$

$$\phi_i^x(x^{(0)}, y^{(0)}) s_i^{(k+1)} - \sum_{i=1}^{K} \frac{\partial I}{\partial y}\bigg|_{(x^{(k)}, y^{(k)})} \phi_i^y(x^{(0)}, y^{(0)}) t_i^{(k+1)} =$$

$$I(x^{(k)}, y^{(k)}) - \mu(x^{(0)}, y^{(0)}) - \sum_{i=1}^{K} \frac{\partial I}{\partial x}\bigg|_{(x^{(k)}, y^{(k)})}$$

$$\phi_i^x(x^{(0)}, y^{(0)}) s_i^{(k)} - \sum_{i=1}^{K} \frac{\partial I}{\partial y}\bigg|_{(x^{(k)}, y^{(k)})} \phi_i^y(x^{(0)}, y^{(0)}) t_i^{(k)}$$

Equation (4) should hold for every point on the grid. Therefore there are MN equations with 2K+L unknown parameters. The set of equations can be written in matrix form using the column stack representation of all the 2D functions:

$$\sum_{i=1}^{L} \psi_i p_i^{(k+1)} - \sum_{i=1}^{K} I_x \cdot \varphi_i^x s_i^{(k+1)} - \sum_{i=1}^{K} I_y \cdot \varphi_i^y t_i^{(k+1)} = \qquad (5)$$

$$I - \mu - \sum_{i=1}^{K} I_x \cdot \varphi_i^x s_i^{(k)} - \sum_{i=1}^{K} I_y \cdot \varphi_i^y t_i^{(k)}$$

In equation (5) and the following definitions, the dot mark is used to describe element-wise multiplication.

Now the following matrices and vectors are defined:
$\Psi = (\psi_1\ \psi_2\ \ldots\ \psi_L)$
$\Phi = (I_x \cdot \phi_1^x\ I_x \cdot \phi_2^x\ \ldots\ I_x \cdot \phi_K^x\ I_y \cdot \phi_1^y\ I_y \cdot \phi_2^y\ \ldots\ I_y \cdot \phi_K^y)$
$A = (\Psi\ -\Phi)$
$r^{(k)} = (s_1^{(k)}\ s_2^{(k)}\ \ldots\ s_K^{(k)}\ t_1^{(k)}\ t_2^{(k)}\ \ldots\ t_K^{(k)})^T$
$p^{(k)} = (p_1^{(k)}\ p_2^{(k)}\ \ldots\ p_L^{(k)})^T$
$q^{(k)} = (p^{(k)T}\ r^{(k)T})^T$ The elements of the vector $q^{(k+1)}$ are the unknown parameters at the k+1 iteration, whereas the elements of the vector $r^{(k)}$ are known from the $k^{th}$ iteration. Rewriting Equation (5) using the above definitions yields:

$$Aq^{(k+1)} = I - \mu - \Phi r^{(k)} \qquad (6)$$

A least squares solution to the system of equations is obtained by multiplying both sides by the pseudo inverse of the matrix A:

$$q^{(k+1)} = (A^T A)^{-1} A^T (I - \mu - \Phi r^{(k)}) \qquad (7)$$

The use of equation 7 allows simultaneous determination of the Eigenspace coefficients and the transformation parameters. This is to be contrasted with the prior art method of obtaining a solution by dividing each iteration into two stages: relying on the transformation parameters from the previous iteration to solve for the Eigenspace coefficients in the first stage, and then relying on the Eigenspace coefficients from the current iteration to solve for the transformation parameters in the second stage.

An alternative method to that of equation 7 for obtaining a solution is now presented. This method is similar to that of the prior art method and is suboptimal, however more efficient.

The vector $p^{(k+1)}$ is obtained by projecting the warped image at the $k^{th}$ iteration onto the Eigenspace:

$$p^{(k+1)} = \Psi^T (I - \mu) \qquad (8)$$

After solving for $p^{(k+1)}$, a least squares solution for $r^{(k+1)}$ is obtained by using the pseudo inverse of the matrix $\Phi$.

Equation (6) is rewritten as follows:

$$\Psi p^{(k+1)} - \Phi r^{(k+1)} = I - \mu - \Phi r^{(k)} \qquad (9)$$

And the solution is given by:

$$r^{(k+1)} = (\Phi^T \Phi)^{-1} \Phi^T (\Psi p^{(k+1)} - I + \mu + \Phi r^{(k)}) = r^{(k)} + (\Phi^T \Phi)^{-1} \Phi^T (\Psi p^{(k+1)} - I + \mu) \qquad (10)$$

Initial conditions for normalization are determined by using the output of the face detection stage. Derivatives of the image are computed by convolving the image with a kernel (such as the Sobel mask). Resampling the image at non integer locations is done using some type of interpolation such as bilinear or bicubic.

The face normalization algorithm can be summarized as follows:
1. Set k=1 and initialize the vector $r^{(k)}$ using the face detection stage.
2. Construct the grid $(x^{(k)}, y^{(k)})$ using the elements of the vector $r^{(k)}$ as specified in equation (1).
3. Resample the image to obtain I and calculate derivatives $I_x$ and $I_y$.
4. Construct the matrices $\Phi$, A and calculate $q^{(k+1)}$ using equation (7) or calculate $p^{(k+1)}$ and $r^{(k+1)}$ separately using equations (8) and (10).
5. Set k←k+1.
6. Construct the vector $r^{(k)}$ from the elements of the vector $q^{(k)}$.
7. If not converged return to 2.

Figure 1B:
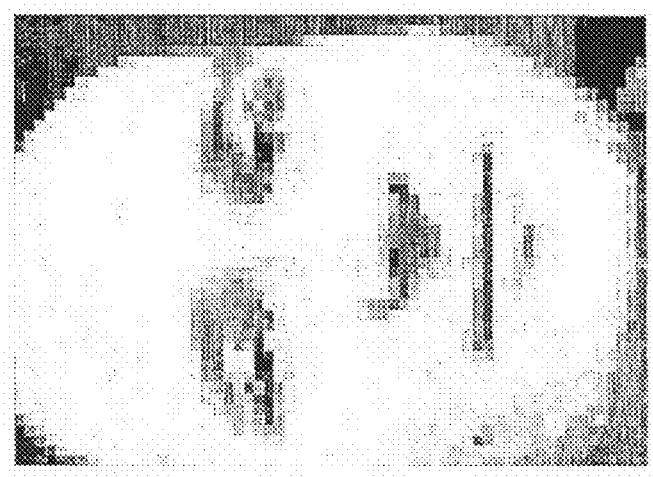
Figure 1C:

FIGS. 1A to 1C show how the normalization algorithm produces a canonical image of a face by using an Eigenspace of frontal views of faces and a polynomial transformation. FIG. 1A is the original probe image as obtained from the detection stage. As can be seen, the image was taken from the side and the face is looking to the left. In order to match the image of FIG. 1A with those in the database, in which all of the images are looking straight forward, the canonical face shown in FIG. 1B is produced by the normalization algorithm. FIG. 1C shows the reconstruction of the normalized face using an Eigenspace constructed from frontal view faces in the database.

Figure 2A:
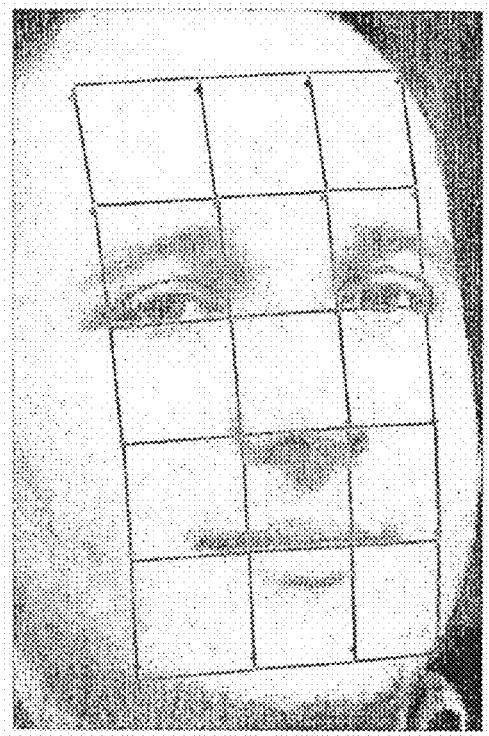
FIGS. 2A and 2B show the deformed and original grid plotted over the original and warped images.
Figure 2B:
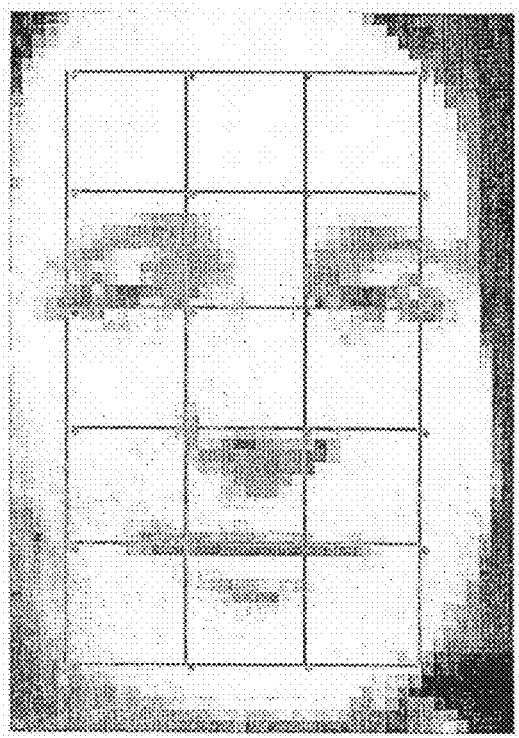

FIG. 2A shows the deformed grid plotted over the original probe image and FIG. 2B shows the corresponding rectangular grid plotted over the resampled (warped) image shown in FIG. 1B.

3. Database Normalization Algorithm

In the previous section an algorithm which takes an image of a face as input and produces a canonical image that best complies with a given database of images was described. In order to obtain the best recognition rates, the faces in the database must be normalized with respect to each other. In this section an algorithm for normalizing the reference images prior to their enrollment into the database is provided.

The concept behind the database normalization algorithm of the invention is to obtain the best approximation for each of the images as a combination of Eigenfaces learnt from the other images. The method of the invention brings all the images in the database to a canonical form, which is dictated by the nature of the images alone and not by the use of some arbitrary criterion. This guarantees the best accuracy possible with a given capacity for storing the Eigenspace coefficients for each face.

If it is desired to construct the data base from n images labeled $I_1, \ldots, I_n$. The vectors $\{\psi_i\}_{i=1}^{L}$ and $\mu$ (described in section 1, hereinabove) are computed from the images $I_2, \ldots, I_n$. Then the first image $I_1$ is normalized to best match the Eigenspace defined by these computed vectors by using the method described in section 2. Now a second Eigenspace is computed from images $I_1, I_3, \ldots, I_n$ and the image $I_2$ is normalized to fit this Eigenspace. The process is continued, each time normalizing one image so as to match the Eigenspace constructed by the others. After finishing normalizing the whole set of images, the whole process is repeated several more times until no significant change is observed between iterations.

The method of the invention for normalization of the database can be summarized as follows:
1. Set k=, j=1.
2. Construct an Eigenspace from the images $I_1, \ldots, I_n$ excluding $I_j$.
3. Normalize the image $I_j$ with respect to the Eigenspace obtained in step 2.
4. Set j←j+1.
5. If j=n and converged then end, else set k←k+1, j=1 and return to step 2.

Although embodiments of the invention have been described by way of illustration, it will be understood that the invention may be carried out with many variations, modifications, and adaptations, without departing from its spirit or exceeding the scope of the claims.

The invention claimed is:

1. An iterative method for normalization of a probe image against the Eigenspace learned from a database of images, said method comprising the following steps:
   (a) initialize the transformation parameters according to said probe image gathered in the detection stage;
   (b) construct a deformed grid using said transformation parameters;
   (c) resample said image using said deformed grid to obtain a resampled image;
   (d) form a set of linear equations that describe the set of transformation parameters and Eigenspace coefficients that, if used to resample the image, will allow improved representation of the image in the Eigenspace as compared to the representation obtained in the previous iteration;
   (e) solve said set of linear equations to simultaneously obtain said transformation parameters and said Eigenspace coefficients; and
   (f) repeat steps (b) through (e) until the change in said transformation parameters between two consecutive iterations are less than a predetermined threshold.

2. An iterative method for normalizing the n images in a database without using a predetermined criterion, said method comprising the following steps:
   (a) construct an Eigenspace comprising all of the images in said database except one;
   (b) use the method of claim 1 to normalize the one image with respect to the Eigenspace formed from the remaining n−1 images;
   (c) repeat steps (a) and (b) n times, each time for a different image; and
   (d) repeat steps (a) to (c) using said normalized images until the changes in the transformation parameters between two consecutive iterations are smaller than a predetermined value.

* * * * *